United States Patent
Su et al.

(10) Patent No.: US 12,277,332 B2
(45) Date of Patent: Apr. 15, 2025

(54) METHOD AND MEMORY DEVICE FOR PERFORMING WEAR LEVELING

(71) Applicant: MACRONIX INTERNATIONAL CO., LTD., Hsinchu (TW)

(72) Inventors: Wei-Cheng Su, New Taipei (TW); Chih-Hsiang Yang, New Taipei (TW); Hsiang-Lan Lung, Kaohsiung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 18/451,907

(22) Filed: Aug. 18, 2023

(65) Prior Publication Data

US 2025/0060892 A1 Feb. 20, 2025

(51) Int. Cl.
*G06F 3/06* (2006.01)

(52) U.S. Cl.
CPC ............ *G06F 3/064* (2013.01); *G06F 3/0616* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,075,707 B2 | 7/2015 | Hsiao | |
| 11,403,018 B2 | 8/2022 | Ke | |
| 2020/0356430 A1 | 11/2020 | Han | |
| 2022/0066925 A1* | 3/2022 | Park | .......... G06F 12/0891 |
| 2022/0374169 A1 | 11/2022 | Zuolo | |

FOREIGN PATENT DOCUMENTS

| | | |
|---|---|---|
| TW | 201137883 A | 11/2011 |
| TW | 202141275 A | 11/2021 |

* cited by examiner

*Primary Examiner* — Kevin Verbrugge
(74) *Attorney, Agent, or Firm* — McClure, Qualey & Rodack, LLP

(57) ABSTRACT

The application provides a method and a memory device for performing wear leveling in a memory device. The method includes: receiving data to be written transmitted by a host in the memory device; predicting the data to be written as a first type of data or a second type of data; referencing an erase count table in an erase count table buffer of the memory device; and when the data to be written is predicted as the first type of data, writing the data to be written into the block with a highest erase count among these blocks, and when the data to be written is predicted as the second type of data, writing the data to be written into the block with a lowest erase count among these blocks.

10 Claims, 8 Drawing Sheets

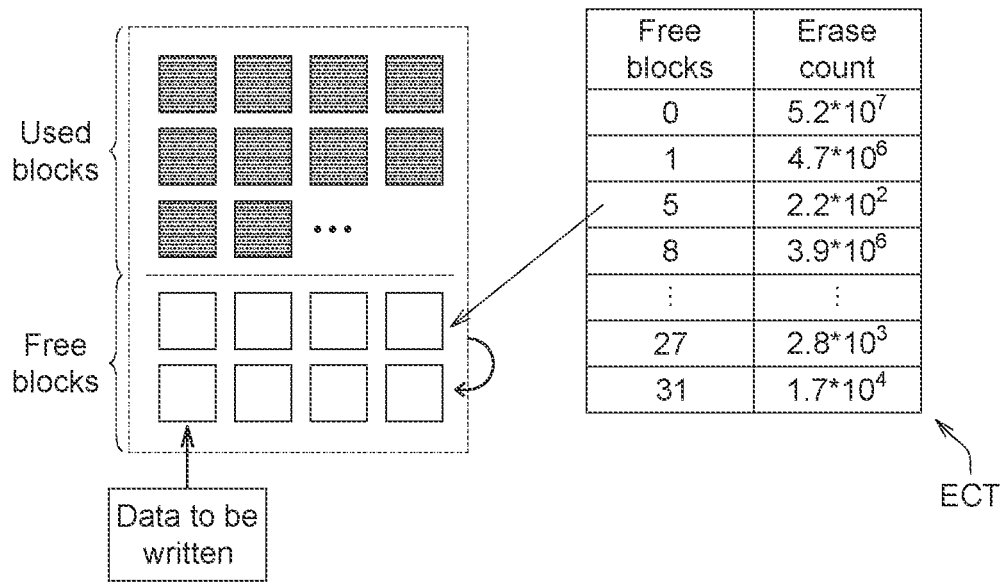
FIG. 5A (Prior art)
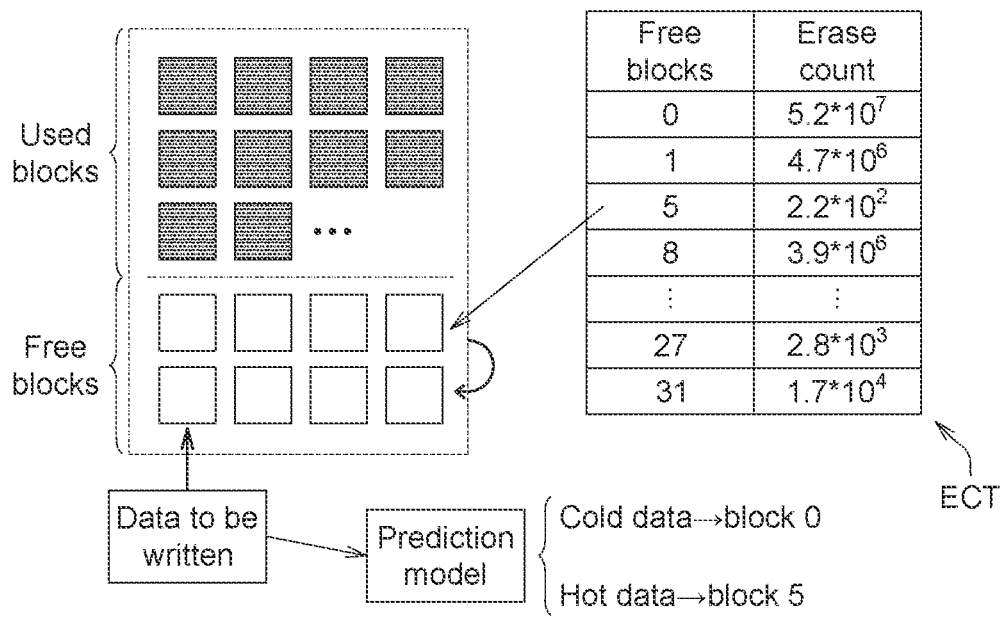
FIG. 5B (The embodiment)

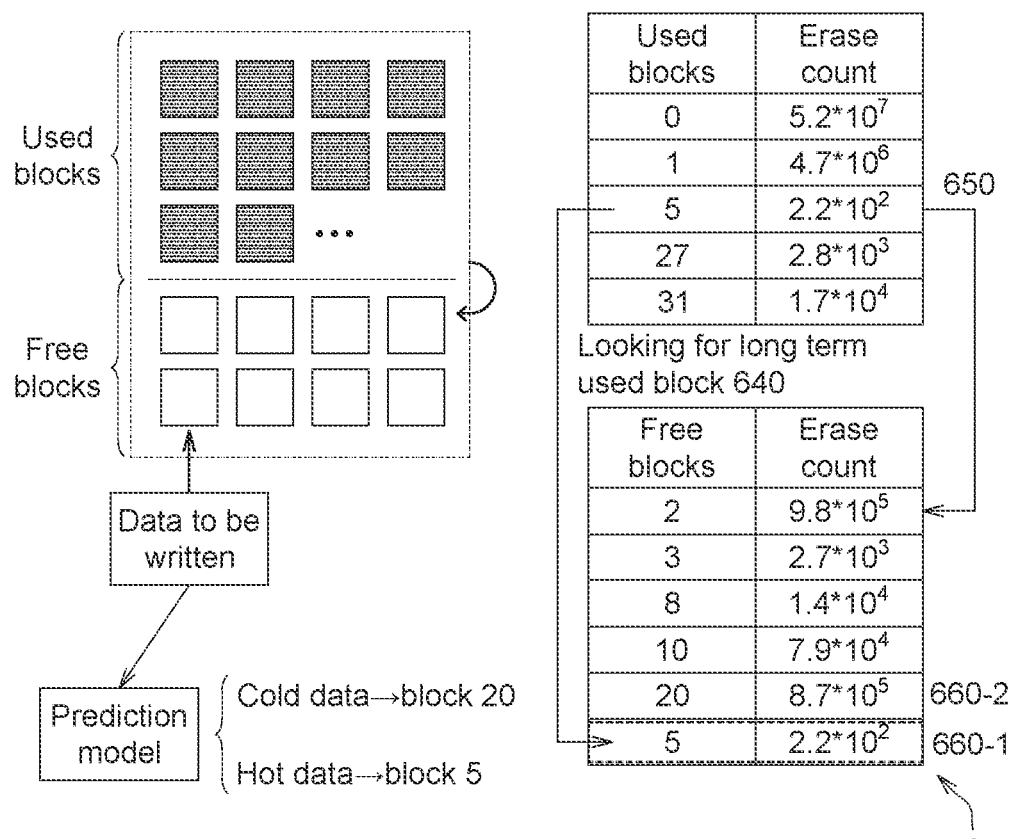
FIG. 6B (The embodiment)

METHOD AND MEMORY DEVICE FOR PERFORMING WEAR LEVELING

TECHNICAL FIELD

The disclosure relates in general to a method and a memory device for performing wear leveling.

BACKGROUND

Wear leveling can be used to extend the lifespan of storage devices such as solid-state drives (SSD) or flash memory.

NAND type flash memory has a fixed lifespan limit on the number of write or erase times. Once this limit is exceeded, the block may no longer reliably store data. This means that if certain blocks are often rewritten (for example, to store frequently changing data), then these often rewritten blocks may end their lifespan early.

The goal of wear leveling is to evenly distribute write and erase operations among all blocks of the flash memory, ensuring that the lifespan of all blocks ends about the same time, in order to maximize the usage lifespan of the flash memory.

Currently, there are two main types of wear leveling techniques: static wear leveling and dynamic wear leveling. Dynamic wear leveling only balances the blocks where data is being written. On the other hand, static wear leveling will periodically redistribute all blocks, including those that have not been rewritten for a long time. These two techniques are usually used together to ensure maximum wear leveling.

However, existing wear leveling techniques are not sufficient in reducing the number of data movements. If the number of data movement can be reduced, it can be more beneficial in extending the lifespan of flash memory.

Therefore, the industry is striving to research new wear leveling techniques in order to further reduce the number of data movements and hence, help extend the lifespan of flash memory.

SUMMARY

According to one embodiment, a method of performing wear leveling in a memory device is provided. The memory device comprises a plurality of blocks. The method includes: receiving data to be written transmitted by a host in the memory device; predicting the data to be written as a first type of data or a second type of data; referencing an erase count table in an erase count table buffer of the memory device; and when the data to be written is predicted as the first type of data, writing the data to be written into the block with a highest erase count among these blocks, and when the data to be written is predicted as the second type of data, writing the data to be written into the block with a lowest erase count among these blocks.

According to one embodiment, provided is a memory device with wear leveling function, comprising: a memory controller including one or more hardware circuits to perform wear leveling; and a memory array, coupled to the memory controller, the memory array comprising a plurality of blocks. When the memory controller receives data to be written transmitted by a host, the memory controller performs: predicting the data to be written as a first type of data or a second type of data; referencing an erase count table in an erase count table buffer of the memory device; and when the data to be written is predicted as the first type of data, writing the data to be written into the block with a highest erase count among these blocks, and when the data to be written is predicted as the second type of data, writing the data to be written into the block with a lowest erase count among these blocks.

BRIEF DESCRIPTION OF THE DRAWINGS

FIG. 5A shows the dynamic wear leveling of the prior art, and FIG. 5B shows the dynamic wear leveling according to one embodiment of the application.

FIG. 6B shows the static wear leveling according to one embodiment of the application.

Figure 1:
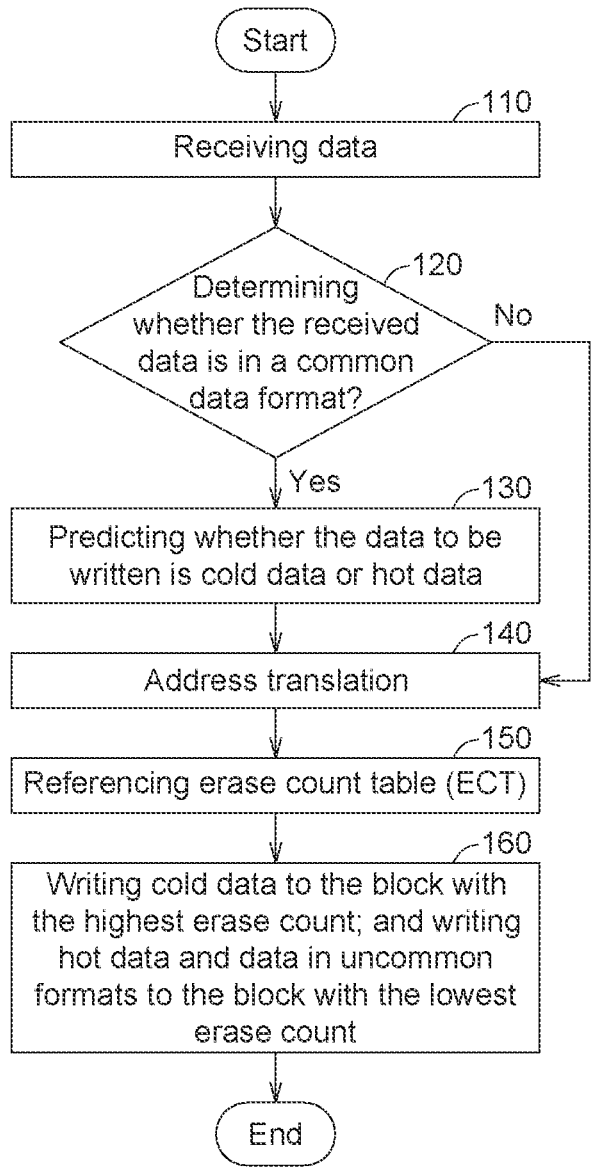
FIG. 1 illustrates a wear leveling method flowchart according to an embodiment of the present application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

In one embodiment of the present application, a predictive model is used to predict whether the data to be written is cold data or hot data, and the storage block for the data to be written is determined based on the prediction result. The predictive model can be, but is not limited to, the support vector machine (SVM) algorithm. Cold data refers to data that is less frequently written and erased, while hot data refers to data that is frequently written and erased. In this way, this embodiment can reduce the frequency of data movement and extend the lifespan of the memory.

Please refer to FIG. 1, which illustrates a wear leveling method flowchart according to an embodiment of the present application. The wear leveling method in FIG. 1 can be executed by the memory controller of a memory device or by a host. The memory controller of the memory device includes one or more hardware circuits to improve the endurance of the memory device through wear leveling. If the wear leveling method in FIG. 1 is executed by the host, the wear leveling method can be executed in firmware. In addition, when the wear leveling method in FIG. 1 is executed in firmware within the host, it can be executed by the host's central processing unit, or in other words, in this situation, the host's central processing unit can also be used to implement the memory controller for improving the endurance of the memory device through wear leveling. The above content is within the scope of the application.

At step 110, data sent by the host is received. At step 120, whether the received data is in a common data format is determined. Here, for example, but not limited to, common data formats include document formats (such as PDF format, doc format, ppt format, xls format), image formats (such as jpg format, etc.), audio formats (mp3 format, etc.), video formats (mp4 format, etc.).

When the judgment at step 120 is yes, the process continues to step 130; and when the judgment at step 120 is no, the process continues to step 140 for performing address translation. When the data is not in a common data format, the data is said to be in an "uncommon data format".

At step 130, the predictive model is used to predict whether the data to be written is cold data or hot data. The predictive model will be explained below. Below, cold data can also be referred to as the first type of data, and hot data can also be referred to as the second type of data.

At step 140, address translation is performed, translating the logical block address sent by the host into a physical block address. Step 140 can, for example, but not limited to, be executed by the Flash Translation Layer.

At step 150, an erase count table (ECT) is referred to. In one embodiment of the present application, the erase count table can be stored in an ECT buffer in the memory device. The ECT buffer stores a plurality of erase counters, which are used to count the erase counts of those blocks.

At step 160, the data is written to a memory block in the memory device, where cold data is written to the block with the highest erase count, and hot data and data in uncommon formats are written to the block with the lowest erase count. The definitions of the blocks with the lowest and highest erase counts will be explained below.

Figure 2:
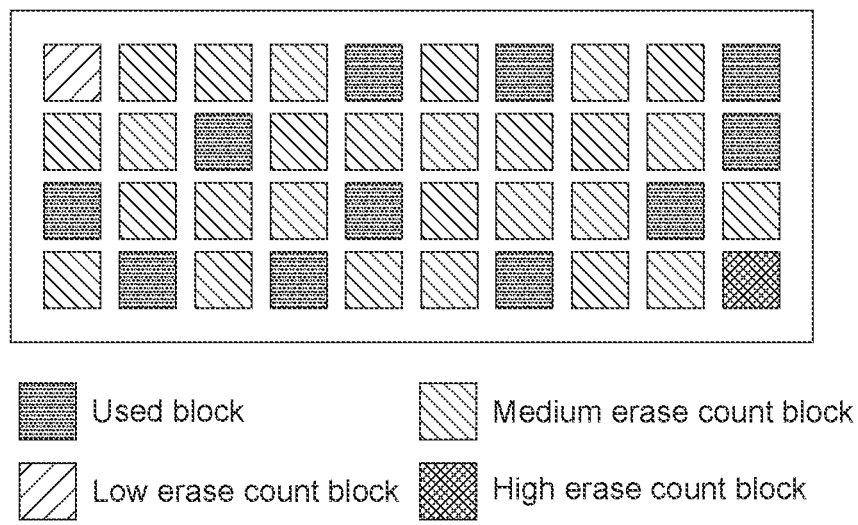
FIG. 2 shows a plurality of blocks of a memory device according to an embodiment of the present application.

FIG. 2 shows a plurality of blocks of a memory device according to an embodiment of the present application. As shown in FIG. 2, the plurality of blocks of the memory device can, for example, but not limited to, be classified into used blocks, low erase count blocks, medium erase count blocks, and high erase count blocks.

Figure 3:
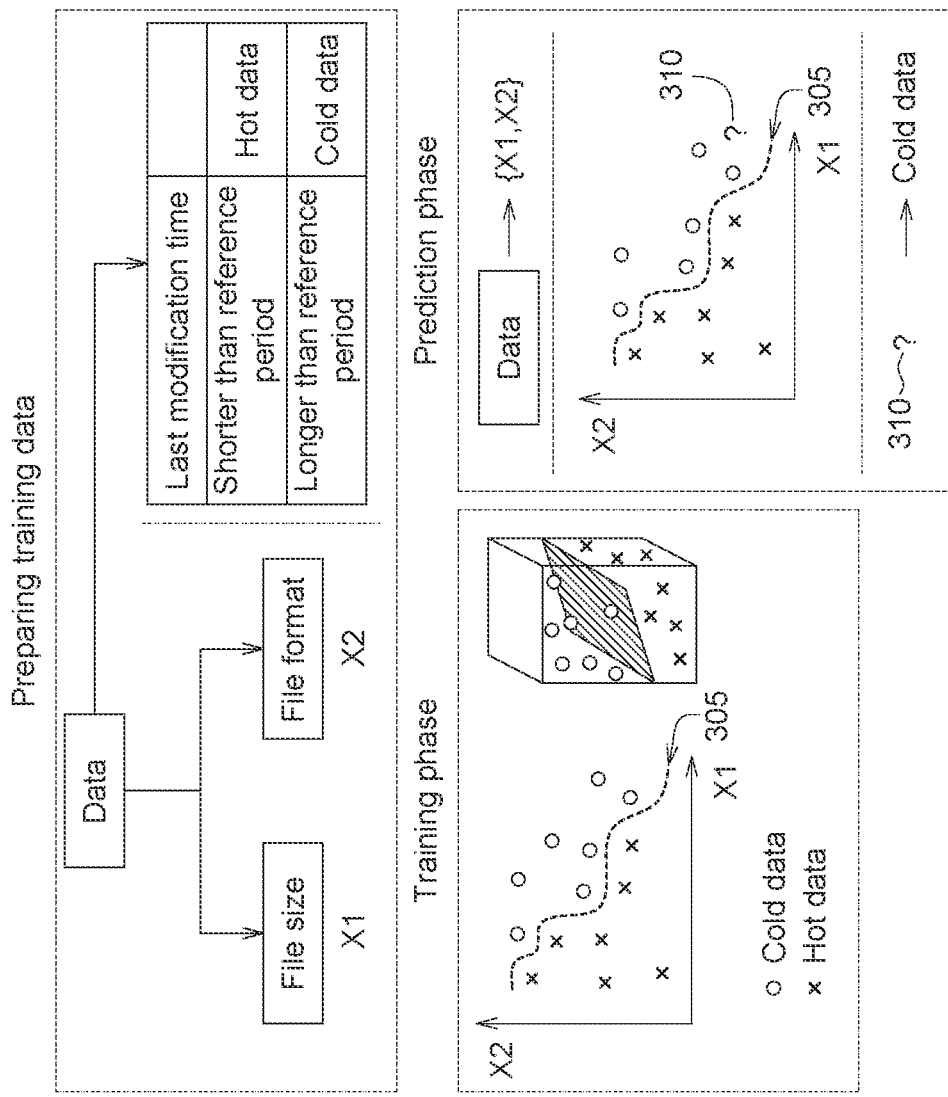
FIG. 3 illustrates the training and prediction phases of the predictive model according to one embodiment of the application.

FIG. 3 illustrates the training and prediction phases of the predictive model according to one embodiment of the application. As shown in FIG. 3, when preparing training data, the file size and file format of the training data are defined as variables X1 and X2, respectively. In the process of preparing the training data, it is determined whether the training data belongs to hot data or cold data based on whether the last modification time of the training data is longer than the reference period (for example, but not limited to, 3 months). If the last modification time of the training data is shorter than the reference period, the training data is determined to be hot data. If the last modification time of the training data is longer than the reference period, the training data is determined to be cold data.

In the training phase of the predictive model, the variables X1 and X2 of a plurality of training data are first organized within a two-dimensional coordinate system. Here, the dotted line 305 represents the dividing line used to separate cold data from hot data. In one embodiment of the application, the training of the predictive model aims to find the optimal dividing line 305 to classify the training data into cold data and hot data. In practice, the support vector machine (SVM) algorithm can use the radial basis function as the kernel function to solve nonlinear classification. Here, the details of the SVM algorithm and the radial basis function do not need to be specifically mentioned.

In the prediction phase of the predictive model, when the data to be written 310 is classified as being on the right side of the dividing line 305, the data to be written 310 is predicted to be cold data. Conversely, when the data to be written 310 is classified as being on the left side of the dividing line 305, the data to be written 310 is predicted to be hot data.

Figure 4:
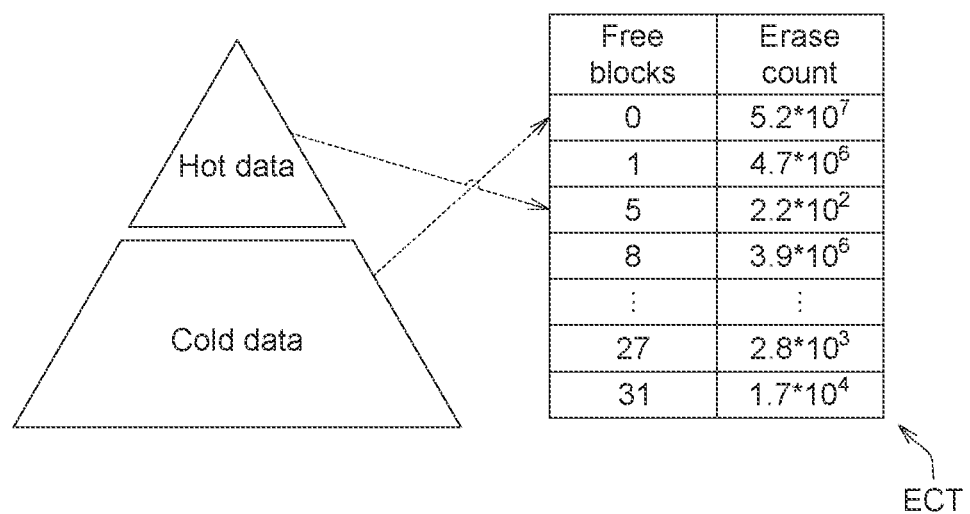
FIG. 4 shows the erase count table according to one embodiment of the application.

FIG. 4 shows the erase count table according to one embodiment of the application. As shown in FIG. 4, the erase count table includes a free block field and an erase count field. The free block field indicates which blocks are free blocks, where free blocks represent blocks that are not written by data. The erase count field indicates the erase counts of the free blocks. In reality, in one embodiment of the application, the used blocks also have corresponding erase counts.

As shown in FIG. 4, for example, but not limited to, blocks 0, 1, 5 . . . 31 are free blocks, and the erase counts of these free blocks are $5.2*10^7$, $1.7*10_4$, respectively. Among them, block 0 has the highest erase count of $5.2*10^7$, and block 5 has the lowest erase count of $2.2*10^2$. Therefore, during writing, hot data or data with uncommon formats are written to block 5 with the lowest erase count of $2.2*10^2$, while cold data are written to block 0 with the highest erase count of $5.2*10^7$.

FIG. 5A shows the dynamic wear leveling of the prior art, and FIG. 5B shows the dynamic wear leveling according to one embodiment of the application. In FIG. 5A, when performing dynamic wear leveling, the data to be written is usually written to the free block with the lowest erase count. However, the problem with the prior dynamic wear leveling is that writing cold data to the free block with the lowest erase count is not the best practice. Because if cold data is written to the free block with the lowest erase count, then hot data will be forced to be written to the free block with a higher erase count. The prior dynamic wear leveling is not conducive to ensuring the maximum level of wear leveling.

Conversely, as shown in FIG. 5B, in one embodiment of the application, when performing dynamic wear leveling, it is judged whether the data to be written is classified as hot data or cold data. Cold data is written to the free block with the highest erase count (block 0 in FIG. 5B as an example), while hot data or data with uncommon formats are written to the free block with the lowest erase count (block 5 in FIG. 5B as an example). In this way, in one embodiment of the application, it is better to write cold data to the free block with the highest erase count and to write hot data to the free block with the lowest erase count. The dynamic wear leveling in one embodiment of the application is conducive to ensuring the maximum level of wear leveling.

Figure 6A:
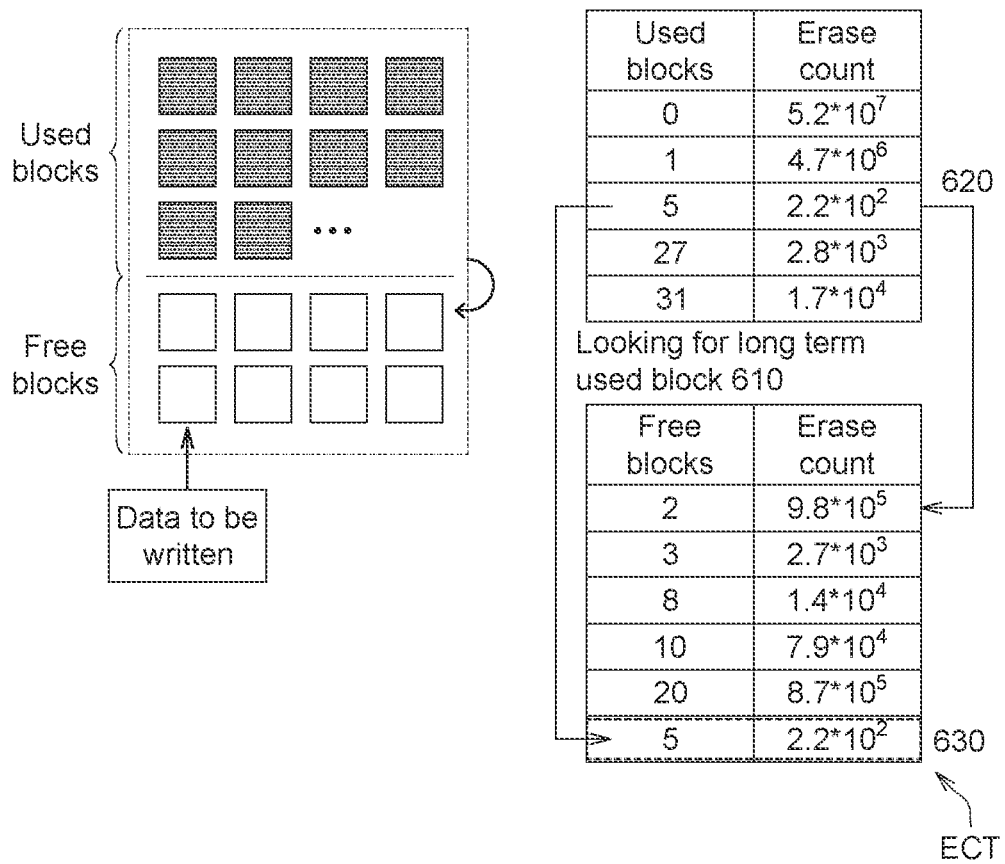
FIG. 6A shows the prior static wear leveling.

FIG. 6A shows the prior static wear leveling, and FIG. 6B shows the static wear leveling according to one embodiment of the application.

In FIG. 6A, when performing static wear leveling, several steps are performed. In Step 610, a long-term used block is sought. In Step 620, data migration is performed to move the data in the used block with the lowest erase count to the free block with the highest erase count. For example, in FIG. 6A, the data in used block 5 with the lowest erase count is moved to free block 2 with the highest erase count, thereby releasing block 5 with the lowest erase count to become free block 5. In Step 630, the data to be written is written to the free block with the lowest erase count.

However, in the prior static wear leveling, although it avoids allowing cold data to occupy the block with the lowest erase count for a long time, it is still possible to write new cold data to the block with the lowest erase count, which is still a problem because it is not conducive to ensuring the maximum level of wear leveling.

In FIG. 6B, during the execution of static wear leveling in one embodiment of the present application, several steps are involved. In step 640, long-term used blocks are sought. In step 650, data migration is performed to move data from the used block with the lowest erase count to the free block with the highest erase count. Using FIG. 6B as an example, data from used block 5, which has the lowest erase count, is migrated to free block 2 with the highest erase count, thereby freeing block 5 with the lowest erase count to become free block 5. When writing data, this embodiment will determine whether the data to be written is hot data or cold data. When the data is hot, in step 660-1, hot data or data in an uncommon data format is written into the free block with the lowest erase count (block 5 in FIG. 6B). When the data is cold, in step 660-2, the cold data to be written is written into the free block with the highest erase count (block 20 in FIG. 6B).

Therefore, in the static wear leveling of this embodiment, it can avoid letting cold data occupy the block with the lowest erase count for a long time, thus ensuring maximum wear leveling.

Figure 7:
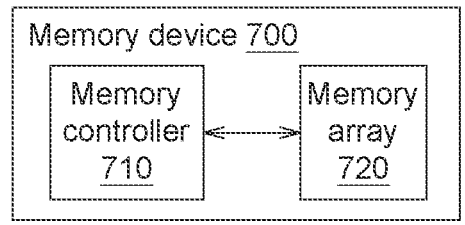
FIG. 7 shows a functional block diagram of a memory device with wear leveling functionality according to one embodiment of the present application.

FIG. 7 shows a functional block diagram of a memory device with wear leveling functionality according to one embodiment of the present application. As shown in FIG. 7, the memory device 700 with wear leveling functionality according to this embodiment includes: a memory controller 710 and a memory array 720. The memory controller 710 is coupled to the memory array 720. The memory controller 710 includes one or more hardware circuits to improve the endurance of the memory device 700 through wear leveling. The memory array 720 includes a plurality of blocks. When the memory controller 710 receives data to be written transmitted by a host (not shown), the memory controller 710 can perform the wear leveling method of the aforementioned embodiment.

Figure 8:
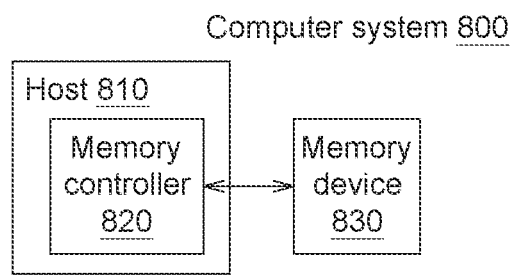
FIG. 8 shows a functional block diagram of a computer system with wear leveling functionality according to one embodiment of the present application.

FIG. 8 shows a functional block diagram of a computer system with wear leveling functionality according to one embodiment of the present application. As shown in FIG. 8, the computer system 800 with wear leveling functionality according to this embodiment includes: a host 810 and a memory device 830. The host 810 has a memory controller 820. The host 810 is coupled to the memory device 830. The memory controller 820 of the host 810 improves the endurance of the memory device 830 through wear leveling. The memory device 830 includes a plurality of blocks. When the memory controller 820 receives data to be written transmitted by other units of the host 810 (not shown), the memory controller 820 can perform the wear leveling method of the aforementioned embodiment.

Another embodiment of the present application discloses a non-transitory computer-readable medium. When the non-transitory computer-readable medium is read by a computer, the computer executes the aforementioned method of performing wear leveling in a memory device.

Although the above embodiments are illustrated with static wear leveling and dynamic wear leveling, the present application is not limited to this. Other embodiments of the present application can also be applied in Global Wear Leveling, which is also within the spirit of the application.

In the above embodiment, although the prediction model is explained with the Support Vector Machine (SVM) algorithm as an example, the present application is not limited to this. Depending on the training data and the context used, in other possible embodiments of the application, the prediction model could also be implemented using other algorithms, such as but not limited to, logistic regression algorithm, decision tree algorithm, and random forest algorithm, which is also within the spirit of the application.

As mentioned above, in one embodiment of the present application, by predicting whether the data to be written is hot or cold, the wear leveling is improved. This embodiment can offer many advantages, such as, but not limited to, improving the performance of the memory controller or host, and ensuring the maximum degree of wear leveling to extend the service life of the memory device.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in a plurality of embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of performing wear leveling in a memory device, the memory device comprising a plurality of blocks, the method including:
   receiving data to be written transmitted by a host in the memory device;
   determining whether the data to be written is in a common data format or in a uncommon data format;
   predicting the data to be written as a first type of data or a second type of data in the common data format;
   referencing an erase count table in an erase count table buffer of the memory device; and
   in response that the data to be written is predicted as the first type of data, writing the data to be written into the block with a highest erase count among these blocks, and in response that the data to be written is predicted as the second type of data, writing the data to be written into the block with a lowest erase count among these blocks,
   wherein in response that the data to be written has the uncommon data format, the data to be written is written to the block with the lowest erase count.

2. The method of claim 1, wherein when the data to be written has the uncommon data format, the data to be written is written to the block with the lowest erase count.

3. The method of claim 1, wherein the erase count table buffer stores a plurality of erase counters, and the erase counters are used to indicate a plurality of erase counts of the blocks.

4. The method of claim 1, wherein wear leveling includes static wear leveling, dynamic wear leveling, and global wear leveling;

prediction of the data to be written is performed by a prediction model; and the prediction model is implemented by a support vector machine algorithm, a logistic regression algorithm, a decision tree algorithm, or a random forest algorithm.

5. The method of claim 1, wherein the first type of data is cold data and the second type of data is hot data.

6. A memory device with wear leveling function, comprising:

a memory controller including one or more hardware circuits to perform wear leveling; and a memory array, coupled to the memory controller, the memory array comprising a plurality of blocks, wherein, after the memory controller receives data to be written transmitted by a host, the memory controller performs:

determining whether the data to be written is in a common data format or in a uncommon data format;

predicting the data to be written as a first type of data or a second type of data in the common data format;

referencing an erase count table in an erase count table buffer of the memory device; and in response that the data to be written is predicted as the first type of data, writing the data to be written into the block with a highest erase count among these blocks, and in response that the data to be written is predicted as the second type of data, writing the data to be written into the block with a lowest erase count among these blocks, wherein in response that the data to be written has the uncommon data format, the data to be written is written to the block with the lowest erase count.

7. The memory device of claim 6, wherein when the data to be written has the uncommon data format, the data to be written is written to the block with the lowest erase count.

8. The memory device of claim 6, wherein the erase count table buffer stores a plurality of erase counters, and the erase counters are used to indicate a plurality of erase counts of the blocks.

9. The memory device of claim 6, wherein wear leveling includes static wear leveling, dynamic wear leveling, and global wear leveling;

prediction of the data to be written is performed by a prediction model; and the prediction model is implemented by a support vector machine algorithm, a logistic regression algorithm, a decision tree algorithm, or a random forest algorithm.

10. The memory device of claim 6, wherein the first type of data is cold data and the second type of data is hot data.

\* \* \* \* \*